US012655316B2

(12) United States Patent
Woo et al.

(10) Patent No.: US 12,655,316 B2
(45) Date of Patent: Jun. 16, 2026

(54) MULTILAYER SHEET AND MULTILAYER ELECTRONIC DEVICE

(71) Applicants: MICROWORKS CO., LTD., Iwol-myeon (KR); MICROWORKS SOLUTIONS CO., LTD., Cheonan-si (KR)

(72) Inventors: Seok-Jong Woo, Cheonan-si (KR); Jun-Ki Park, Cheonan-si (KR); Hyung-Woo Cho, Cheonan-si (KR); Kwangho Jang, Suwon-si (KR); Kweon Hyung Han, Suwon-si (KR)

(73) Assignees: MICROWORKS CO., LTD., Iwol-myeon (KR); MICROWORKS SOLUTIONS CO., LTD., Cheonan-si (KR)

( * ) Notice: Subject to any disclaimer, the term of this patent is extended or adjusted under 35 U.S.C. 154(b) by 428 days.

(21) Appl. No.: 18/329,865

(22) Filed: Jun. 6, 2023

(65) Prior Publication Data

US 2023/0399537 A1 Dec. 14, 2023

(30) Foreign Application Priority Data

Jun. 13, 2022 (KR) ........................ 10-2022-0071625

(51) Int. Cl.
*C09D 133/14* (2006.01)
*C08J 7/043* (2020.01)
*C08J 7/046* (2020.01)
*G09F 9/30* (2006.01)

(52) U.S. Cl.
CPC ............ *C09D 133/14* (2013.01); *C08J 7/043* (2020.01); *C08J 7/046* (2020.01); *C08J 2433/00* (2013.01); *G09F 9/301* (2013.01)

(58) Field of Classification Search
CPC .. C09D 133/14; C08J 8/043; B32B 2307/412; B32B 2307/536; B32B 2255/10
See application file for complete search history.

(56) References Cited

U.S. PATENT DOCUMENTS

2016/0155574 A1* 6/2016 Ishikawa ................ C09B 57/00
438/80
2017/0253707 A1 9/2017 Lim et al.
2020/0010736 A1 1/2020 Lee et al.
2021/0050553 A1 2/2021 Ogawa et al.
(Continued)

FOREIGN PATENT DOCUMENTS

CN 111771145 A 10/2020
CN 116694243 A 9/2023
(Continued)

OTHER PUBLICATIONS

Chinese Office Action issued on Mar. 1, 2026, in counterpart Chinse Patent Application No. 202310621289.8. (7 pages in English, 7 pages in Chinese).

*Primary Examiner* — Mark S Kaucher
(74) *Attorney, Agent, or Firm* — NSIP Law

(57) ABSTRACT

A multilayer sheet including a transparent film with a total light transmittance of 85% or more in accordance with ISO 13468, a coating layer disposed on a first surface of the transparent film, and an elastic film disposed below a second surface of the transparent film is disclosed. The Martens hardness HM measured on a surface of the coating layer is 180 N/mm$^2$ or more.

16 Claims, 3 Drawing Sheets

(56)  References Cited

U.S. PATENT DOCUMENTS

| 2021/0268786 | A1 | 9/2021 | Kim et al. |
| 2023/0271404 | A1 | 8/2023 | Woo et al. |

FOREIGN PATENT DOCUMENTS

| EP | 2412773 | B1 | | 6/2016 |
| JP | 2019119084 | A | * | 7/2019 |
| JP | 2019-181924 | A | | 10/2019 |
| JP | 2019-195994 | A | | 11/2019 |
| JP | 2020-82440 | A | | 6/2020 |
| JP | 2021-109327 | A | | 8/2021 |
| KR | 10-2017-0103644 | A | | 9/2017 |
| KR | 10-1798759 | B1 | | 12/2017 |
| KR | 10-1810422 | B | | 12/2017 |
| KR | 10-2095004 | B1 | | 3/2020 |
| KR | 10-2021-0109952 | A | | 9/2021 |
| TW | 202136366 | A | | 10/2021 |
| WO | WO 2010/110135 | A1 | | 9/2010 |

* cited by examiner

MULTILAYER SHEET AND MULTILAYER ELECTRONIC DEVICE

CROSS-REFERENCE TO RELATED APPLICATIONS

This application claims the benefit under 35 U.S.C. 119(a) of Korean Patent Application No. 10-2022-0071625, filed on Jun. 13, 2022, in the Korean Intellectual Property Office, the entire disclosure of which is incorporated herein by reference for all purposes.

BACKGROUND

1. Field

The present disclosure relates to a multilayer sheet applicable for protection of a display and the like, and a multilayer electronic device including the same.

2. Description of Related Art

Surface protection sheets are used with a wide variety of devices, including mobile devices such as cellular phones, smartphones, and tablet PCs and information processing terminals such as automatic teller machines (ATMs) and kiosks. With the emergence of various types of display devices such as foldable display devices, flexible display devices, and rollable display devices, there is a demand for display devices with surface hardness sufficient to suppress scratches on a surface and durability sufficient to withstand repeated folding, rolling or like. In addition, particular optical characteristics are required when these protection sheets are applied to a display screen.

SUMMARY

In one general aspect, a multilayer sheet including a transparent film with a total light transmittance of 85% or more in accordance with ISO 13468, a coating layer disposed on a first surface of the transparent film, and an elastic film disposed below a second surface of the transparent film is disclosed. The Martens hardness HM measured on a surface of the coating layer is 180 N/mm² or more.

A modulus of elasticity ηIT measured on the surface of the coating layer may be 62% or more.

A ratio of a thickness of the transparent film to the elastic film may be in a range of 0.5 to 3.

A strain-restoration index (TR index) (units: μm) may be a value according to:

$$TR\ \text{index} = \frac{15 \times HMd \times Rcd}{CITd \times H_{IT}},$$

wherein the TR index measured on the surface of the coating layer is in a range of 0.8 to 2, wherein a unit of the TR index is μm, and wherein HMd denotes a Martens hardness value (N/(mm²*μm)) per unit thickness (1 μm) of the multilayer sheet, measured on a surface of the coating layer, CITd denotes an indentation creep value (%/μm) per unit thickness (1 μm) of the multilayer sheet, measured on the surface of the coating layer, Rcd denotes a recovery rate (%/μm) per unit thickness (1 μm) of the multilayer sheet, measured on the surface of the coating layer, and $H_{IT}$ denotes an indentation hardness (N/mm²) of the multilayer sheet measured on the surface of the coating layer.

In another general aspect, a multilayer sheet includes a transparent film, a coating layer disposed on a first surface of the transparent film, an adhesive layer below a second surface of the transparent film, and an elastic film below the adhesive layer. The Martens hardness (HM) measured on a surface of the coating layer is 180 N/mm² or more.

An indentation creep value per unit thickness (1 μm) of the multilayer sheet measured on the surface of the coating layer may be in a range of 0.02%/μm to 0.05%/μm.

A recovery rate per unit thickness (1 μm) of the multilayer sheet measured on the surface of the coating layer may be in a range of 0.4%/μm to 1.2%/μm.

A ratio between a thickness of the elastic film and a thickness of the adhesive layer may be 1:0.02 to 1.

A recovery rate of the multilayer sheet may be 66% or more.

In another general aspect, a multilayer electronic device includes a transparent film, a coating layer disposed on a first surface of the transparent film, and an elastic film disposed below a second surface of the transparent film, and a light-emitting functional layer below the multilayer sheet. The Martens hardness HM measured on a surface of the coating layer is 180 N/mm² or more.

The multilayer electronic device may also include an adhesive layer below the second surface of the transparent film with the elastic film disposed below the adhesive layer.

A modulus of elasticity ηIT measured on the surface of the coating layer may be 62% or more.

A ratio of a thickness of the transparent film to the elastic film may be in a range of 0.5 to 3.

The transparent film may have a total light transmittance of 85% or more in accordance with ISO 13468.

A strain-restoration index (TR index) (units: μm) may be a value according to:

$$TR\ \text{index} = \frac{15 \times HMd \times Rcd}{CITd \times H_{IT}},$$

wherein the TR index measured on the surface of the coating layer is in a range of 0.8 to 2, wherein a unit of the TR index is μm, and wherein HMd denotes a Martens hardness value (N/(mm²*μm)) per unit thickness (1 μm) measured on a surface of the coating layer, CITd denotes an indentation creep value (%/μm) per unit thickness (1 μm) measured on the surface of the coating layer, Rcd denotes a recovery rate (%/μm) per unit thickness (1 μm) measured on the surface of the coating layer, and $H_{IT}$ denotes an indentation hardness (N/mm²) measured on the surface of the coating layer.

An indentation creep value per unit thickness (1 μm) of the multilayer sheet measured on the surface of the coating layer may be in a range of 0.02%/μm to 0.05%/μm.

A recovery rate per unit thickness (1 μm) of the multilayer sheet measured on the surface of the coating layer may be in a range of 0.4%/μm to 1.2%/μm.

A ratio between a thickness of the elastic film and a thickness of the adhesive layer may be 1:0.02 to 1.

A recovery rate of the multilayer sheet may be 66% or more.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
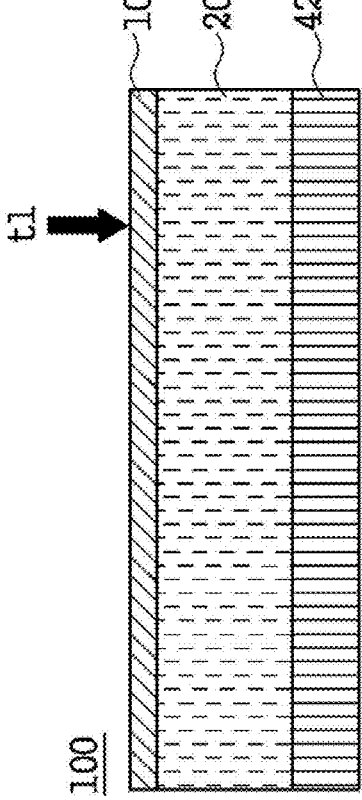
FIG. 1 is a conceptual sectional view illustrating a cross section of a structure of a multilayer sheet according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

In this disclosure, the phrase that a certain element "comprises" or "includes" another element means that the certain element may further include one or more other elements but does not preclude the presence or addition of one or more other elements, unless stated to the contrary.

In this disclosure, when an element is referred to as being "connected" to another element, it can be understood not only as a case of a certain element directly connected to the other element but also as a case of having other elements interposed therebetween.

In this disclosure, "B being placed on A" means that B is placed in direct contact with A or placed over A with another layer or structure interposed therebetween and thus should not be interpreted as being limited to B being placed in direct contact with A.

In this disclosure, "on (or below)" each layer will be described on the basis of the accompanying drawings. However, the position of each layer should not be understood as being limited to that shown in the drawings, and the differentiation between upper and lower layers should be understood as a relative concept for describing the position of each layer.

In this disclosure, the term "a combination thereof" included in an expression of the Markush form refers to a mixture or combination of one or more elements selected from the group consisting of elements described in the Markush form and should be understood as at least one selected from the group consisting of the elements.

In this disclosure, the expression "A and/or B" should be understood as "A," "B," or "A and B."

In this disclosure, terms such as "first" and "second" or "A" and "B" are used to distinguish one element from another unless otherwise described.

In this disclosure, singular forms are intended to include plural forms as well, unless the context clearly indicates otherwise.

In this disclosure, storage modulus is measured at a temperature of −50° C. to 100° C. using the DMA7100 model of HITACHI according to ASTM D4065. A temperature increase rate is set to 5° C./min.

In this disclosure, room temperature is about 20° C. and ordinary temperature is about 25° C.

An in-plane retardation Ro is a parameter defined as the product ($\Delta nxy \times d$) of anisotropy ($\Delta nxy = |nx-ny|$) of refractive indexes of two axes orthogonal within a plane of a target to be measured (a film or sheet, hereinafter interchangeably referred to as a film) and a thickness d, and is a criterion indicating optical isotropy or anisotropy. A minimum in-plane retardation Romin is the smallest value among in-plane retardations Ro measured at multiple points in a plane of the film.

In this disclosure, a thickness direction retardation Rth is a parameter defined as an average of retardations obtained by multiplying two birefringences $\Delta nxz$ ($=|nx-nz|$) and $\Delta nyz$ ($=|ny-nz|$), when viewed from a cross section of a film in a thickness direction, by a thickness d of the film respectively. A maximum in-plane retardation Rthmax is a largest value among in-plane retardations Rth measured at multiple points in a plane of the film.

In this disclosure, characters and/or numbers described together with the name of a compound are an abbreviation of the name of the compound.

In the present specification, a relative size, thickness, etc. of each component shown in the drawings may be exaggerated for clarity.

Hereinafter, a multilayer sheet according to an embodiment will be described in further detail.

The objective of the present disclosure relates to a multilayer sheet and a multilayer electronic device. The multilayer sheet provides protection of a display and the like.

Figure 2:
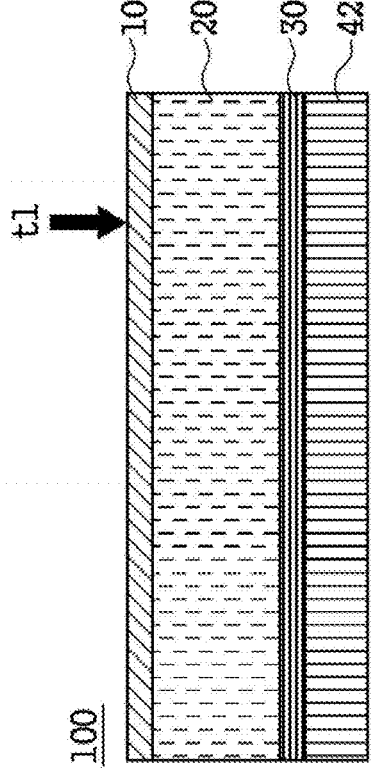
FIG. 2 is a conceptual sectional view illustrating a cross section of a structure of a multilayer sheet according to one embodiment.

FIG. 1 is a conceptual sectional view (diagram) illustrating a cross section of a structure of a multilayer sheet according to an embodiment. FIG. 2 is a conceptual sectional view illustrating a cross section of a structure of a multilayer sheet according to another embodiment. A multilayer sheet according to an embodiment will be described in more detail with reference to FIGS. 1 and 2 below.

As shown in FIG. 1, a multilayer sheet 100 according to an embodiment includes a transparent film 20, a coating layer 10 on one surface (for example, a first surface) of the transparent film 20, and an elastic film 42 below another surface (for example, a second surface) of the transparent film 20.

To achieve the above object, the multilayer sheet 100 according to another embodiment includes a transparent film 20, a coating layer on one surface of the transparent film 20, an adhesive layer 30 below another surface of the transparent film 20, and an elastic film 42 below the adhesive layer 30.

The transparent film 20 is a support of the multilayer sheet 100 and may be used as a base layer of the coating layer 10 and the adhesive layer 30.

The transparent film 20 is a film having a total light transmittance (light transmittance) of 85% or more according to ISO 13468. The transparent film 20 may have a light transmittance of 85% or more. For example, the light transmittance may be 88% or more, 89% or more, or 99% or less. However, the light transmittance is not limited thereto if applicable to a support layer of a cover film of a display.

A haze of the transparent film 20 may be 3% or less. For example, the haze may be 2% or less, 1.5% or less, or 1% or less. The haze may be greater than 0%. In this case, the multilayer sheet 100 may become more transparent.

A yellow index YI of the transparent film 20 may be 3 or less. For example, the yellow index YI may be 3 or less, 2.8 or less, 2.2 or less, 1.0 or less, 0.8 or less, or 0.5 or less. The yellow index YI may be greater than 0.

The transparent film 20 may have excellent retardation characteristics.

An in-plane retardation Ro of the transparent film 20 may be 600 nm or less, 500 nm or less, 400 nm or less, 300 nm or less, or 200 nm or less. When the in-phase retardation Ro is in the above range, the occurrence of rainbow stains depending on a viewing angle may be minimized when the multilayer sheet 100 is applied to the front of a display.

A minimum in-plane retardation $Ro_{min}$ of the transparent film 20 may be 200 nm or less or 150 nm or less. Specifically, the minimum in-plane retardation Romin may be 120 nm or less, 100 nm or less, 85 nm or less, 75 nm or less, or 65 nm or less.

A lower limit of the in-plane retardation Ro of the transparent film 20 may be 0 nm or may be set to 10 nm or more, 30 nm or more, or 50 nm or more to balance optical properties and mechanical properties.

A thickness direction retardation Rth of the transparent film 20 may be 4,000 nm or more, 5,000 nm or more, or 5,500 nm or more.

A maximum thickness direction retardation $Rth_{max}$ of the transparent film 20 may be 6,000 nm or more, e.g., 6,500 nm or more, 7,500 nm or more, 8,000 nm or more, or 8,500 nm or more.

A ratio Rth/Ro of the thickness direction retardation Rth to the in-plane retardation Ro of the transparent film 20 may be 10 or more, 15 or more, or 20 or more. The ratio Rth/Ro is preferably maintained large, thereby increasing the probability of prevention of rainbow stains as the in-plane retardation Ro decreases and the thickness direction retardation Rth increases.

A ratio $Rth_{max}/Ro_{min}$ of the maximum thickness direction retardation $Rth_{max}$ to the minimum in-plane retardation $Ro_{min}$ of the transparent film 20 may be 30 or more, 40 or more, 50 or more, or 60 or more.

A transparent film having the above-described characteristics has a large degree of molecular orientation, thus causing the promotion of crystallization and thus may have mechanical properties of an appropriate level or higher. In this case, the occurrence of rainbow stains can be effectively suppressed. The retardation is based on a value measured for the transparent film 20 having a thickness of 40 μm to 50 μm.

The transparent film 20 may have tensile strength of 15 kgf/mm² or more. Specifically, the tensile strength may be 18 kgf/mm² or more, 20 kgf/mm² or more, 21 kgf/mm² or more or 22 kgf/mm² or more.

The transparent film 20 may have an elongation of 15% or more. Specifically, the elongation may be 16% or more, 17% or more, or 17.5% or more.

The transparent film 20 may have a modulus of 2.5 GPa or more. For example, the modulus may be 3 GPa or more, 3.5 GPa or more, 3.8 GPa or more, or 4.0 GPa or more. The modulus may be 10 GPa or less or 8 GPa or less.

The transparent film 20 may have compressive strength of 0.4 kgf/μm or more. Specifically, the compressive strength may be 0.45 kgf/μm or more or 0.46 kgf/μm or more.

A polyester-based film may be used as the transparent film 20.

A polyimide-based film may be used as the transparent film 20.

A polyamide-based film may be used as the transparent film 20.

A polyimide-amide-based film may be used as the transparent film 20.

For example, the transparent film 20 may be a transparent polyester-based film.

The polyester-based film may include a polyester-based resin.

The polyester-based resin may be a homopolymer resin or a copolymer resin obtained by polycondensation of a dicarboxylic acid and a diol. In addition, the polyester-based resin may be a blended resin in which the homopolymer resin and the copolymer resin are mixed.

Examples of the dicarboxylic acid include terephthalic acid, isophthalic acid, orthophthalic acid, 2,5-naphthalenedicarboxylic acid, 2,6-naphthalenedicarboxylic acid, 1,4-naphthalenedicarboxylic acid, 1,5-naphthalenedicarboxylic acid, diphenylcarboxylic acid, diphenoxyethane dicarboxylic acid, diphenylsulfone carboxylic acid, anthracene dicarboxylic acid, 1,3-cyclopentanedicarboxylic acid, 1,3-cyclohexanedicarboxylic acid, 1,4-cyclohexanedicarboxylic acid, hexahydroterephthalic acid, hexahydroisophthalic acid, malonic acid, dimethylmalonic acid, succinic acid, 3,3-diethylsuccinic acid, glutaric acid, 2,2-dimethylglutaric acid, adipic acid, 2-methyl adipc acid, trimethyl adipic acid, pimelic acid, azelaic acid, sebacic acid, suberic acid, dodecadicarboxylic acid, etc.

Examples of the diol include ethylene glycol, propylene glycol, hexamethylene glycol, neopentyl glycol, 1,2-cyclohexanedimethanol, 1,4-cyclohexanedimethanol, decamethylene glycol, 1,3-propanediol, 1,4-butanediol, 1,5-pentanediol, 1,6-hexanediol, 2,2-bis (4-hydroxyphenyl) propane, bis (4-hydroxyphenyl) sulfone, etc.

Preferably, the polyester-based resin may be an aromatic polyester-based resin with high crystallinity. For example, the polyester-based resin may include a polyethylene terephthalate (PET) resin as a main component.

When the transparent film 20 is a polyester-based film, the polyester-based film may include a polyester-based resin (specifically, PET resin) in an amount of about 85 wt % or more, and more specifically, 90 wt % or more, 95 wt % or more, or 99 wt % or more. As another example, the polyester-based film may include a polyester-based resin, as well as the PET resin. Specifically, the polyester-based film may further include a polyethylene naphthalate (PEN) resin in an amount of about 15 wt % or less. More specifically, the polyester-based film may further include the PEN resin in an amount of about 0.1 wt % to 10 wt % or about 0.1 wt % to 5 wt %.

A polyester-based film having the above composition may have increased crystallinity and improved mechanical properties, such as tensile strength, through heating, stretching, and the like during the manufacture thereof.

The transparent film 20 may further include a filler, in addition to the polyester-based resin.

The filler may be at least one selected from the group consisting of barium sulfate, silica, and calcium carbonate. The filler may be included in the transparent film 20 to control roughness and winding properties and also to improve runnability and an anti-scratch effect during the manufacture of the transparent film 20.

The filler may have a particle size of 0.01 μm or more and less than 1.0 μm. For example, the particle size of the filler may be in a range of 0.05 μm to 0.9 μm or 0.1 μm to 0.8 μm but is not limited thereto.

The filler may be included in an amount of 0.01 to 3 wt % based on the total weight of the transparent film 20. For example, the filler may be included in an amount of 0.05 to 2.5 wt %, 0.1 to 2 wt %, or 0.2 to 1.7 wt % based on the total weight of the transparent film 20, but is not limited thereto.

A thickness of the transparent film 20 may be 15 μm or more, 20 μm or more, 30 μm or more, 40 μm or more, 55 μm or more, 65 μm or more, 75 μm or more, or 100 μm or more, or 500 μm or less, 400 μm or less, 300 μm or less, 200 μm or less, 120 μm or less, 95 μm or less, or 85 μm or less. As a specific example, the thickness of the transparent film 20 may be in a range of 15 μm to 120 μm and more specifically, a range of 20 μm to 95 μm or 25 μm to 85 μm. In the above thickness range, the transparent film 20 may exhibit excellent optical properties, as well as sufficient mechanical properties.

SH33/34 products, SH37/38 products, TF110 products V7610 products, V5400 products, V7611 products, TU94 products, TU63A products, TOF50 products, etc., which are sold by SKC, are applicable as the transparent film 20 but embodiments are not limited thereto.

The transparent film 20 may be manufactured by a general transparent film manufacturing method.

For example, a polyester-based film may be manufactured by (1) extruding a composition containing a polyester resin to obtain an unstretched film, (2) stretching the unstretched film in a longitudinal direction and a width direction, and (3) heat-setting the stretched film.

In the manufacturing method, the unstretched film is manufactured by extruding a raw resin, and performing preheating, stretching, and heat setting. The extrusion of the raw resin may be performed at a temperature of 230° C. to 300° C. or 250° C. to 280° C.

The unstretched film is preheated at a certain preheating temperature before stretching. The range of the preheating temperature may be determined to be a range that satisfies not only a range of Tg+5° C. to Tg+50° C. based on the glass transition temperature Tg of the polyester resin but also a range of 70° C. to 90° C. When the range of the preheating temperature satisfies the above ranges, flexibility of the unstretched film sufficient to be easily stretched is secured, and at the same time, the unstretched film may be effectively prevented from being broken during stretching.

The stretching of the unstretched film may be carried out by biaxial stretching, and the unstretched film may be biaxially stretched, for example, a width direction (tenter direction TD) and a longitudinal direction (machine direction MD) by simultaneous biaxial stretching or sequential biaxial stretching. Preferably, sequential biaxial stretching may be performed by first stretching the unstretched film in one (for example, a first) direction and thereafter stretching the first stretched film in a direction perpendicular to the (first) direction.

A stretching ratio d1 in the longitudinal direction is in a range of 2.0 to 5.0, and more specifically, a range of 2.8 to 3.5. A stretching ratio d2 in the width direction may be in a range of 2.0 to 5.0, and more specifically, a range of 2.9 to 3.7. Preferably, the stretching ratio d1 in the longitudinal direction and the stretching ratio d2 in the width direction are substantially the same, and specifically, a ratio d2/d1 of the stretching ratio d2 to the stretching ratio d1 may be in a range of 0.5 to 1.0, 0.7 to 1.0, or 0.9 to 1.0. The stretching ratios d1 and d2 are ratios representing lengths of the unstretched film after stretching when a length of the unstretched film is 1.0 before stretching. The stretching speed may be in a range of 6.5 m/min to 8.5 m/min but is not particularly limited.

The stretched sheet may be heat-set at 150° C. to 250° C., and more specifically, 160° C. to 230° C. The heat setting of the stretched sheet may be performed for 5 seconds to 1 minute, and more specifically, for 10 seconds to 45 seconds.

After the heat setting of the stretched sheet starts, the film may be relaxed in the longitudinal direction and/or the width direction, and a temperature range at this time may be 150° C. to 250° C.

The coating layer 10 may be provided on one surface of the transparent film 20.

A lower surface of the coating layer 10 may face the transparent film 20 and an upper surface of the coating layer 10 may be an outermost surface exposed to the outside.

The lower surface of the coating layer 10 may be in direct contact with the transparent film 20 or may be bonded on the transparent film 20 through an additional layer.

The coating layer 10 may be in direct contact with one surface of the transparent film 20.

The coating layer 10 may contribute to an improvement in mechanical properties and/or optical properties of the transparent film 20.

The coating layer 10 may include at least one coating material from among an organic component, an inorganic component, and an organic-inorganic composite component.

The coating material may include an organic resin. Specifically, the organic resin may be a curable resin or a binder resin.

The coating layer 10 may be a curable coating layer.

The coating layer 10 may include at least one selected from the group consisting of a urethane acrylate-based compound, an acrylic ester-based compound, an acrylate-based compound, and an epoxy acrylate-based compound, or a cured product thereof.

The coating layer 10 may include a urethane acrylate-based compound, an acrylic ester-based compound, or a cured product thereof.

The coating layer 10 may include a urethane acrylate-based compound, an acrylic ester-based compound, an acrylate-based compound, or a cured product thereof.

The urethane acrylate-based compound may include a urethane bond as a repeating unit, and include a plurality of functional groups.

The urethane acrylate-based compound may be a urethane compound formed by the reaction of a diisocyanate compound and a polyol of which end is substituted with an acrylate group.

For example, the diisocyanate compound may include at least one of linear, branched or cyclic aliphatic diisocyanate compounds having 4 to 12 carbon atoms and aromatic diisocyanate compounds having 6 to 20 carbon atoms. The polyol may include 2 to 4 hydroxyl groups (—OH), and may be linear, branched or cyclic aliphatic polyol compounds having 4 to 12 carbon atoms or aromatic polyol compounds having 6 to 20 carbon atoms. The substitution of the end of the urethane acrylate-based compound may be performed by an acrylate-based compound having a functional group capable of reacting with an isocyanate group (—NCO). For example, an acrylate-based compound having a hydroxyl group, an amine group, or the like, and a hydroxyalkyl acrylate or aminoalkyl acrylate having 2 to 10 carbon atoms may be used.

The urethane acrylate-based compound may include 2 to 15 functional groups.

Examples of the urethane acrylate-based compound include, but are not limited thereto, a bifunctional urethane acrylate oligomer having a weight-average molecular weight of 1400 to 25000, a trifunctional urethane acrylate oligomer having a weight-average molecular weight of 1700 to 16000, a tetrafunctional urethane acrylate oligomer having a weight-average molecular weight of 500 to 2000, a hexafunctional urethane acrylate oligomer having a weight-average molecular weight of 818 to 2600, a nonafunctional urethane acrylate oligomer having a weight-average molecular weight of 2500 to 5500, a decafunctional urethane acrylate oligomer having a weight-average molecular weight of 3200 to 3900, a pentadecafunctional urethane acrylate oligomer having a weight-average molecular weight of 2300 to 20000, and the like.

The glass transition temperature Tg of the urethane acrylate-based compound is in a range of −80° C. to 100° C., −80° C. to 90° C., −80° C. to 80° C., −80° C. to 70° C., −80° C. to 60° C., −70° C. to 100° C., −70° C. to 90° C., −70° C. to 80° C., −70° C. to 70° C., −70° C. to 60° C., −60° C. to 100° C., −60° C. to 90° C., −60° C. to 80° C., −60° C. to 70° C., −60° C. to 60° C., −50° C. to 100° C., −50° C. to 90° C., −50° C. to 80° C., −50° C. to 70° C., or −50° C. to 60° C.

The acrylic ester-based compound may be at least one selected from the group consisting of substituted or unsubstituted acrylates and substituted or unsubstituted methacrylates. The acrylic ester-based compound may include 1 to 10 functional groups.

Examples of the acrylic ester-based compound may include, but are not limited to, trimethylolpropane triacrylate (TMPTA), trimethylolpropane ethoxy triacrylate (TMPEOTA), glycerin propoxylated triacrylate (GPTA), pentaerythritol tetraacrylate (PETA), dipentaerythritol hexacrylate (HA), and the like.

The weight-average molecular weight of the acrylic ester-based compound may be in a range of 500 to 6,000, 500 to 5,000, 500 to 4,000, 1000 to 6,000, 1000 to 5,000, 1000 to 4,000, 1500 to 6,000, 1500 to 5,000, or 1500 to 4,000. The acrylate equivalent of the acrylic ester-based compound may be in a range of 50 g/eq to 300 g/eq, 50 g/eq to 200 g/eq, or 50 g/eq to 150 g/eq.

The acrylate-based compound may include 1 to 10 functional groups. Examples of the acrylate-based compound include a monofunctional acrylate oligomer having a weight-average molecular weight of 100 to 300, a bifunctional acrylate oligomer having a weight-average molecular weight of 250 to 2000, or an epoxy acrylate oligomer having a weight-average molecular weight of 1000 to 3000.

The epoxy acrylate-based compound may include 1 to 10 functional groups. Examples of the epoxy acrylate-based compound include, but are not limited to, a monofunctional epoxy acrylate oligomer having a weight-average molecular weight of 100 to 300, a bifunctional epoxy acrylate oligomer having a weight average molecular weight of 250 to 2000, or a tetrafunctional epoxy acrylate oligomer having a weight-average molecular weight of 1000 to 3000. The epoxy equivalent of the epoxy acrylate-based compound may be in a range of 50 g/eq to 300 g/eq, 50 g/eq to 200 g/eq, or 50 g/eq to 150 g/eq.

The organic resin may be contained in an amount of 30 to 100 wt %, 40 to 90 wt %, or 50 to 80 wt % based on the total weight of coating layer 10.

The coating layer 10 may further selectively include a filler.

The filler may be, for example, inorganic particles. For example, the filler may be silica, barium sulfate, zinc oxide, or alumina. The filler may have a particle size of 1 nm to 100 nm. Specifically, the particle size of the filler may be in a range of 5 nm to 50 nm or 10 nm to 30 nm. The filler may include inorganic fillers having different particle diameter distributions. For example, the filler may include a first inorganic filler having a D50 of 20 nm to 35 nm and a second inorganic filler having a D50 of 40 nm to 130 nm. The filler may be contained in an amount of 25 wt % or more, 30 wt % or more, or 35 wt % or more, based on the total weight of the coating layer 10. Alternatively, the filler may be contained in an amount of 50 wt % or less, 45 wt % or less, or 40 wt % or less, based on the total weight of the coating layer 10. Preferably, the coating layer 10 may not include an inorganic filler such as silica. In this case, for example, the adhesion between the transparent film 20 and the coating layer 10 having the above composition may be improved.

The coating layer 10 may further include a photoinitiator or a reaction product thereof. The photoinitiator may be involved in a process of curing a resin or the like to obtain the coating layer 10.

Examples of the photoinitiator include, but are not limited to, 1-hydroxy-cyclohexyl-phenyl ketone, 2-hydroxy-2-methyl-1-phenyl-1-propanone, 2-hydroxy-1-[4-(2-hydroxy-ethoxy)phenyl]-2-methyl-1-propanone, methylbenzoylformate, $\alpha,\alpha$-dimethoxy-$\alpha$-phenylacetophenone, 2-benzoyl-2-(dimethylamino)-1-[4-(4-morpholinyl)phenyl]-1-butanone, 2-methyl-1-[4-(methylthio)phenyl]-2-(4-morpholinyl)-1-propanone diphenyl (2,4,6-trimethylbenzoyl)-phosphine oxide, or bis (2,4,6-trimethylbenzoyl)-phenylphosphine oxide, and the like. Examples of a commercial product include Irgacure 184, Irgacure 500, Irgacure 651, Irgacure 369, Irgacure 907, Darocur 1173, Darocur MBF, Irgacure 819, Darocur TPO, Irgacure 907, Esacure KIP 100F, etc. A single photoinitiator or a mixture of two or more different types of photoinitiators may be used as the photoinitiator.

The coating layer 10 may further include functions such as an anti-glare function, an anti-fouling function, and an antistatic function.

The coating layer 10 may further include an antifoulant. For example, the coating layer 10 may include a fluorine-based compound. The fluorine-based compound may have an anti-fouling function. Specifically, the fluorine-based compound may be an acrylate-based compound having a perfluorine-based alkyl group, and perfluorohexylethyl acrylate as a specific example, but is not limited thereto.

The coating layer 10 may further include an antistatic agent. The antistatic agent may include an ionic surfactant. For example, the ionic surfactant may include an ammonium salt or a quaternary alkyl ammonium salt, and the ammonium salt and the quaternary alkylammonium salt may include a halide such as chloride and bromide.

The coating layer 10 may further include an additive such as a surfactant, a UV absorber, a UV stabilizer, an anti-yellowing agent, a leveling agent, or a dye for improving a color value. For example, the surfactant may be mono- or bifunctional fluorine-based acrylate, a fluorine-based surfactant, or a silicone-based surfactant. The surfactant may be included in a dispersed or crosslinked form in the coating layer 10. The UV absorber may be a benzophenone-based compound, a benzotriazole-based compound, a triazine-based compound or the like, and the UV stabilizer may be tetramethyl piperidine or the like. An amount of such an additive may be variously adjusted within a range that does not degrade the physical properties of the coating layer 10. For example, the additive may be contained in an amount of 0.01 to 10 wt % based on the total weight of the coating layer 10 but is not limited thereto.

The coating layer 10 may be a single layer or include two or more layers.

When the coating layer 10 is formed as a single layer, not only the surface durability of the multilayer sheet 100 may be increased but also anti-fingerprint or anti-contamination functions may be provided.

A thickness of the coating layer 10 may be 2 μm or more, 3 μm or more, 5 μm or more, or 7 μm or more, and may also be 50 μm or less, 30 μm or less, 20 μm or less, or 10 μm or less. When the thickness of the coating layer 10 is in the above range, the coating layer 10 may be formed to have a small thickness while securing an appropriate level or more of durability, e.g., surface durability, of the multilayer sheet 100 and maintaining the flexibility of the entire multilayer sheet 100.

The coating layer 10 may be formed by a coating layer manufacturing method.

The coating layer manufacturing method may include curing a composition for preparing a coating layer after coating.

The composition for preparing a coating layer may include at least one of an organic resin composition, an inorganic resin composition, and an organic-inorganic composite composition.

The composition for preparing a coating layer may include at least one of an acrylate-based compound, a siloxane compound, or a silsesquioxane compound. The composition for preparing a coating layer may further include inorganic particles.

Specific examples of the composition for preparing a coating layer may include a urethane acrylate-based compound, an acrylic ester-based compound, and a fluorine-based compound.

The composition for preparing a coating layer may further include a photoinitiator, an antifouling additive, an antistatic agent, other additives, and/or an organic solvent as needed.

The organic solvent may be an alcohol-based solvent such as methanol, ethanol, isopropyl alcohol, or butanol; an alkoxy alcohol-based solvent such as 2-methoxyethanol, 2-ethoxyethanol, or 1-methoxy-2-propanol; a ketone-based solvent such as acetone, methyl ethyl ketone, methyl isobutyl ketone, methyl propyl ketone, and cyclohexanone; an ether-based solvent such as propylene glycol monopropyl ether, propylene glycol monomethyl ether, ethylene glycol monoethyl ether, ethylene glycol monopropyl ether, ethylene glycol monobutyl ether, diethylene glycol monomethyl ether, diethyl glycol monoethyl ether, diethyl glycol monopropyl ether, diethyl glycol monobutyl ether, or diethylene glycol-2-ethylhexyl ether; an aromatic solvent such as benzene, toluene, or xylene; or a mixture thereof.

An amount of the organic solvent may be variously adjusted within a range that does not degrade physical properties of the coating layer 10 and thus is not particularly limited. However, the organic solvent may be included in the composition for preparing a coating layer, such that a weight ratio of solid content to organic solvent may be about 1:1 to 250, based on the solid content among components included in the composition for preparing a coating layer. When the organic solvent is in the above range, appropriate levels of fluidity and coating properties may be achieved.

The composition for preparing a coating layer may include 10 to 30 wt % of an organic resin, 0.1 to 5 wt % of a photoinitiator, 0.01 to 2 wt % of an antifouling additive, 0.1 to 10 wt % of an antistatic agent, and the remainder as an organic solvent.

According to the above composition, all of mechanical, antifouling and antistatic properties of the coating layer 10 may be improved.

The composition for preparing a coating layer may be applied on a transparent film by a conventional coating method and then cured. The coating method may be a bar coating method, a knife coating method, a roll coating method, a blade coating method, a die coating method, a micro-gravure coating method, a comma coating method, a slot die coating method, a lip coating method, a solution casting method, or the like.

The applied composition for preparing a coating layer may be dried and cured sequentially or simultaneously.

The drying of the applied composition is a process of removing an organic solvent from the applied composition for preparing a coating layer. The drying of the applied composition may be performed at 40° C. to 100° C., and preferably, 40° C. to 80° C., 50° C. to 100° C., or 50° C. to 80° C., and performed for about 1 minute to 20 minutes, and preferably, 1 minute to 10 minutes or 1 minute to 5 minutes.

The curing of the applied composition is a process of inducing a chemical reaction in the composition for preparing a coating layer. An appropriate photocuring and/or heat curing method may be applied depending on the resin or the like applied to the composition for preparing a coating layer.

The elastic film 42 preferably has a stable elastic property in a wide temperature range.

The elastic film 42 may have a storage modulus of 3 GPa or less at room or ordinary temperature. The elastic film 42 may have a storage modulus of 2 GPa or less at room or ordinary temperature.

The elastic film 42 has a relatively low storage modulus at room or ordinary temperature compared to a PET film or the like. Due to the above characteristics, the elastic film 42 or the multilayer sheet 100 including the same may be provided with more stable bending characteristics, and the degree of external impact to be transferred to an object on a rear surface of the elastic film 42 may be further alleviated.

The elastic film 42 may have a storage modulus of 2300 MPa or less or 2000 MPa or less at −40° C. The elastic film 42 may have a storage modulus of 200 MPa or more, 400 MPa or more, or 500 MPa or more at −40° C.

The elastic film 42 may have a storage modulus of 2500 MPa or less or 2000 MPa or less at 0° C. The elastic film 42 may have a storage modulus of 20 MPa or more or 150 MPa or more at 0° C. The elastic film 42 may have a storage modulus of 180 to 1200 MPa at 0° C.

The elastic film 42 may have a storage modulus of 10 MPa or more or 90 MPa or more at 40° C. The elastic film 42 may have a storage modulus of 3000 MPa or less or 2000 MPa or less at 40° C. The elastic film 42 may have a storage modulus of 100 to 1200 MPa at 40° C.

The elastic film 42 may have a storage modulus of 4 MPa or more or 20 MPa or more at 80° C. The elastic film 42 may have a storage modulus of 2000 MPa or less or 1000 MPa or less at 80° C. The elastic film 42 may have a storage modulus of 40 to 950 MPa or 60 to 350 MPa at 80° C.

The difference between a storage modulus of the elastic film 42 at 80° C. and a storage modulus of the elastic film 42 at −40° C. may be in a range of −1000 MPa to 1000 MPa. For convenience of description, the difference may be expressed as an absolute value obtained by subtracting a small value from a large value, and in this case, may be 1000 MPa. The elastic film 42 having the above characteristics shows a relatively small storage modulus difference in a wide temperature range of low temperature to high temperature and thus may exhibit stable storage modulus characteristics in a significantly wide temperature range.

A storage modulus index of the elastic film 42 expressed by Equation 2 below may be in a range of 20 to 350 MPa.

$$K_{SM} = \left( \frac{SM_{-40} \times SM_{80}}{SM_{20}} \right) - SM_{80} \qquad \text{[Equation 2]}$$

In Equation 2 above, $K_{SM}$ denotes a storage modulus index of the elastic film 42, and $SM_n$ denotes a storage modulus (MPa) of the elastic film 42 measured at a temperature of n ° C.

For example, $SM_{40}$ is a storage modulus (MPa) of the elastic film 42 measured at temperature −40° C., $SM_{20}$ is a storage modulus (MPa) of the elastic film 42 measured at temperature 20° C., and $SM_{80}$ is a storage modulus (MPa) of the elastic film 42 measured at temperature 80° C.

When the elastic film 42 has a storage modulus index as described above, a degree of change of storage modulus in a relatively wide temperature range is relatively stable and thus stable elastic properties may be exhibited in a wide temperature range.

The elastic film 42 may have an impact strength of 2500 kJ/m$^2$ or more, 3500 kJ/m$^2$ or more, or 4500 kJ/m$^2$ or more. The elastic film 42 may have an impact strength of 5000 kJ/m$^2$ or more or 10000 kJ/m$^2$ or less. The elastic film 42 having the above characteristics may easily absorb external impacts and may not be easily broken or damaged and thus may be very useful as a cover film.

The elastic film 42 may have an absorbed energy of 1.4 J or more or 1.5 J or more. The elastic film 42 may have an absorbed energy of 1.6 J or more or 2.0 J or less. The elastic film 42 having the above characteristics may absorb external impacts easily and thus reduce the degree of impact to be transferred to an object to be protected without being easily damaged, and thus is very useful as a cover film.

The impact strength and the absorbed energy are based on a result of evaluating the tensile-impact strength of an elastic film according to JISK 7160, and particular measurement conditions are based on those presented in experimental examples below.

The elastic film 42 may have a thickness of less than 2000 μm. The thickness of the elastic film 42 may be 1500 μm or less, 1000 μm or less, 500 μm or less, 300 μm or less, 200 μm or less, or 100 μm or less. The thickness of the elastic film 42 may be 1 μm or more. The thickness of the elastic film 42 may be 10 μm or more, 20 μm or more, or 30 μm or more.

The elastic film 42 has excellent optical properties.

The elastic film 42 may have a haze of 3% or less or 2% or less. The elastic film 42 may have a haze of 1.5% or less or 1.2% or less. The elastic film 42 may have a haze of 0.01% or more or 0.1% or more. When the haze of the elastic film 42 is in the above range, the elastic film 42 is applicable to a display area of a display device.

The elastic film 42 may have a visible light transmittance of 85% or more, 88% or more, or 90% or more. The elastic film 42 may have a visible light transmittance of 99.99% or less. The elastic film 42 having the above characteristics or the multilayer sheet 100 including the same is useful as a protective layer (or cover window) of an electronic device.

The elastic film 42 may have a yellow index (Y.1) of 1 or less. The yellow index may be a value measured in a YIE313(D65/10) mode by applying Color meter ultra scanpro manufactured by HunterLab.

A value obtained by subtracting a yellow index of the elastic film 42 before exposure to ultraviolet rays having a wavelength of 280 to 360 nm at an output of 3.0 W for 72 hours from a yellow index of the elastic film 42 after the exposure to the ultraviolet rays may be 2 or less. A value obtained by subtracting a yellow index of the elastic film 42 before exposure to ultraviolet rays having a wavelength of 280 to 360 nm at an output of 3.0 W for 72 hours from a yellow index of the elastic film 42 after the exposure to the ultraviolet rays may be 1 or less. A value obtained by subtracting a yellow index of the elastic film 42 before exposure to ultraviolet rays having a wavelength of 280 to 360 nm at an output of 3.0 W for 72 hours from a yellow index of the elastic film 42 after the exposure to the ultraviolet rays may be 0.1 or more. The elastic film 42 having the above characteristics may have excellent UV durability and thus minimizes or prevents yellowing of the coating layer 10 even when exposed to ultraviolet rays.

Cloudiness may not be actually observed in the elastic film 42. Substantially, a ratio of an area of the elastic film 42 in which cloudiness is observed to a total area of the elastic film 42 may be less than 1%. In this case, the total area is based on a total film area to be applied to a product. Cloudiness may be objectified through haze measurement and considered as being recognizable when the measured haze is greater than 1%. The degree of cloudiness may be adjusted by controlling the degree of gelation of a resin to be applied to the manufacture of the elastic film 42, a molecular weight distribution of the resin, etc.

The elastic film 42 may have excellent durability. The excellent durability of the elastic film 42 may be determined as a result of a dynamic bending test.

The dynamic bending test may be conducted 200,000 times according to the IEC 62715-6-1 standard by bending the elastic film 42 to a radius of curvature of 2 mm at −40° C. and for 2 seconds/per test and checking whether cracks occur in the elastic film 42.

The elastic film 42 may have excellent durability and thus cracks may not actually occur therein after the dynamic bending test is conducted 200,000 times according to the IEC 62715-6-1 standard by bending the elastic film 42 to the radius of curvature of 2 mm at −40° C. and for 2 seconds/per test.

When a tendency that elasticity at a low temperature is lower than that at ordinary or high temperature is taken into account, the above characteristics of the elastic film 42 may be understood to mean that the elastic film 42 has excellent elasticity even when being repeatedly subjected to a bending test in a wide temperature range.

The elastic film 42 may include a polymer containing an amide moiety as a repeating unit.

The elastic film 42 may be a plastic film including the polymer having an amide moiety as a repeating unit.

The elastic film 42 may be an elastomer film including the polymer having an amide moiety as a repeating unit.

The amide moiety may be contained in an amount of 50 wt % or more or 60 wt % or more, based on the total weight of the polymer included in the elastic film 42. The amide moiety may be contained in an amount of 80 wt % or less or 70 wt % or less, based on the total weight of the polymer included in the elastic film 42. When the polymer having the above characteristics is applied to the elastic film 42, the mechanical properties of the elastic film 42 may be improved.

The elastic film 42 may include elastic polyamide (long-chain polyamide). The elastic polyamide may be, for example, Rilsan®, Rilsamid®, or the like of Akema.

The elastic film 42 may include polyether block amide (PEBA). The PEBA includes two phases: a polyamide region which is a hard region and a polyether region which is a soft region. The polyamide region has a melting point of about 80° C. or higher, and specifically, about 130 to 180° C., and thus may be substantially a hard region with a crystalline phase. The polyether region has a glass transition temperature of about −40° C. or less, and specifically, −80 to −40° C., and thus may be substantially an amorphous soft region. For example, the PEBA may be Pebax® or Pebax®Rnew® of ARKEMA, VESTAMID®E of EVONIK, or the like.

The elastic film 42 may include a copolymer of thermoplastic polyurethane (TPU), i.e., a copolymer of a polyurethane block (PU) and polyether block (PE), also called polyether urethane.

The elastic film 42 may include copolyetherester (COPE). A film prepared by a suitable method may be applied as the elastic film 42.

The adhesive layer 30 is disposed below the other surface of the transparent film 20.

An upper surface of the adhesive layer 30 may face the transparent film 20, and may be in direct contact with the transparent film 20 or bonded on the transparent film 20 through an additional layer.

The upper surface of the adhesive layer 30 may be in direct contact with the other surface of the transparent film 20.

A lower surface of the adhesive layer 30 may be in direct contact with the elastic film 42 or bonded on the elastic film 42 through another layer.

The adhesive layer 30 may be applied as part of a multilayer electronic device by directly bonding the lower surface of the adhesive layer 30 on a light-emitting functional layer or bonding the lower surface of the adhesive layer 30 on the light-emitting functional layer with an additional intermediate layer interposed therebetween.

An optical transparent adhesive layer may be applied as the adhesive layer 30.

An acrylic-based adhesive layer, a urethane-based adhesive layer, or a silicone-based adhesive layer, and particularly, the silicone-based adhesive layer may be used as the adhesive layer 30. When the silicone-based adhesive layer is used, an adhesive layer having high light transmittance, thermal resistance and weather resistance may be provided. In particular, an adhesive layer of an embodiment to be described below has strong adhesion even in a small thickness and thus may contribute to further improvement of physical properties of a multilayer sheet, compared with a conventional optically clear adhesive (OCA) such as an acrylic-based adhesive layer.

An adhesive layer having high adhesion may be applied as the adhesive layer 30.

To maintain the physical properties of a multilayer sheet well even when repeatedly bent or folded, not only the performance of a transparent film or a coating layer but also the performance of an adhesive layer for fixing the transparent film or the coating layer and suppressing delamination should be improved. In accordance with the present disclosure, performance may be improved by using a silicone-based adhesive layer.

The silicone-based adhesive layer may be obtained by applying a silicone adhesive composition and drying and/or curing the applied silicone adhesive composition.

The silicone adhesive composition may include a silicone adhesive, a catalyst, and a solvent.

In an embodiment, a silicone MQ resin may be further provided to improve the adhesion of the silicone-based adhesive layer. Here, the silicone MQ resin is a polymer having a siloxane skeleton with at least two methyl groups among cage-like oligosiloxanes represented by a general formula of RnSiXmOy. In the general formula, R may denote an alkyl group having 1 to 5 carbon atoms and include at least two methyl groups. In the general formula, X denotes hydrogen, a hydroxyl group, a chloride group, or an alkoxy group having 1 to 5 carbon atoms. In the general formula, n, m, and y are each an integer ranging from 2 to 200. Specifically, mono-terminated siloxane units (M units) represented by $R_1R_2X_3SiO_{1/2}$ and tetra-terminated siloxane units (Q units) represented by $SiO_{4/2}$ may be provided. The weight-average molecular weight of the silicone MQ resin may be in a range of 2000 to 8000 g/mol. When the silicone MQ resin is applied to the adhesive layer, the adhesion, and particularly, initial adhesion, of the adhesive layer may be improved.

A commercially available silicone adhesive that can be used for optical purposes may be applied as the silicone adhesive. Specifically, a peroxide curable silicone adhesive or an additional reactive silicone adhesive may be applied.

For example, the peroxide curable silicone adhesive may be KR-100, KR-101-10, or KR-130 of SHIN-ETSU Chemical Co., Ltd., DOWSIL SH 4280 of the Dow Chemical Company, SilGrip PSA 510 of Momentive Performance Materials, or a product equivalent thereto.

For example, the additional reactive silicone adhesive may be KR-3700, KR-3701, X-40-3237, X-40-3240, or X-40-3291-1 of SHIN-ETSU Chemical Co., Ltd.; DOWSIL SD4580, DOWSIL 4584, DOWSIL 4585 or DOWSIL 4587L of the Dow Chemical Company; SilGrip TSR15 or TSR16 of Momentive Performance Materials, or a product equivalent thereto.

As the silicone adhesive, the additional reactive silicone adhesive may be preferable in terms of process convenience.

The silicone MQ resin may be applied together with the silicone adhesive to enhance adhesion. For example, the silicone MQ resin may be X-92-128 or X-41-3003 of SHIN-ETSU Chemical Co., Ltd.; SilGrip SR545 or SilGrip SR1000 of Momentive Performance Materials; or a product equivalent thereto.

As the catalyst, a platinum catalyst may be used, and for example, CAT-PL-50T of SHIN-ETSU Chemical Co., Ltd. or a product equivalent thereto may be applied. The catalyst may contribute to reducing a curing time and thus an adhesive layer may be efficiently formed without causing substantial damage to a substrate even when a transparent film or the substrate relatively vulnerable to heat is used.

As the solvent, for example, toluene or the like may be used, but the type of solvent is not limited in instances in which the performance of the silicone-based adhesive layer is not degraded.

The silicone adhesive composition may contain a silicone MQ resin in an amount of 5 parts by weight or more, 8 parts by weight or more, 10 parts by weight or more, 20 parts by weight or more, 30 parts by weight or more, or 40 parts by weight or more, based on 100 parts by weight of the silicone adhesive. The silicone adhesive composition may contain a silicone MQ resin in an amount of 90 parts by weight or less, 80 parts by weight or less, 70 parts by weight or less, or 60 parts by weight or less, based on 100 parts by weight of the silicone adhesive. When the silicone adhesive and the silicone MQ resin are used together in the above ratio, the adhesive strength of the silicone adhesive may be excellent even when formed to a significantly small thickness.

The silicone adhesive composition may include the catalyst in an amount of 0.5 to 2 parts by weight or 0.8 to 1.5 parts by weight, based on 100 parts by weight of the silicone adhesive. The catalyst promotes curing to efficiently form an adhesive layer from the silicone adhesive composition.

The silicone adhesive composition may further include a solvent, and the solvent dilutes or gives fluidity to the silicone adhesive composition to facilitate workability such as coating and form a relatively thin adhesive layer having excellent physical properties. As the solvent, for example, toluene may be used, but the type of solvent is not limited as long as the physical properties of the silicone adhesive composition are not degraded.

For example, the silicone adhesive composition may contain the silicone adhesive in an amount of 20 to 30 wt %, the silicone MQ resin in an amount of 2 to 25 wt %, the catalyst in an amount of 0.2 to 0.5 wt %, and the solvent in an amount of 50 to 70 wt %.

The silicone adhesive composition may be applied on the other surface of the transparent film 20 to form a curable silicone-based adhesive layer. The silicone adhesive composition may be applied on one surface of a separate base film (not shown) and laminated on the other surface of the transparent film 20 to form the curable silicone-based adhesive layer. However, according to the process order, drying and curing may be performed immediately after the application of the silicone adhesive composition or performed as separate processes. A thin layer may be formed by coating with the silicone adhesive composition, and included in the adhesive layer before the thin layer is dried and completely cured by heat or light. A dried layer, which has yet to be completed dried, of the silicone adhesive composition is referred to as a precursor layer of the curable silicone-based adhesive layer.

The precursor layer may be cured by heat or light to form the adhesive layer 30. For example, the precursor layer may be disposed in direct contact with a surface on which the precursor layer is to be adhered and thermally cured at 90 to 130° C. for 1 to 5 minutes to form an adhesive layer.

The adhesive layer 30 may include a repeating unit derived from a silicone adhesive and a repeating unit derived from a silicone MQ resin. The adhesive layer 30 may contain the repeating unit, which is derived from the silicone MQ resin, in an amount of 5 parts by weight or more, 8 parts by weight or more, 10 parts by weight or more, 20 parts by weight or more, 30 parts by weight or more, or 40 parts by weight or more, based on 100 parts by weight of the repeating unit derived from the silicone adhesive. The adhesive layer 30 may contain the repeating unit, which is derived from the silicone MQ resin, in an amount of 90 parts by weight or less, 80 parts by weight or less, 70 parts by weight or less, or 60 parts by weight or less, based on 100 parts by weight of the repeating unit derived from the silicone adhesive. In this case, the adhesive layer 30 may exhibit excellent optical characteristics and adhesion of a sufficient level or more even when the adhesive layer 30 is formed of a smaller thickness.

For stable bending and rolling characteristics, the storage modulus of the adhesive layer 30 may be in a certain range. Considering that heat may be generated in a display device, etc. depending on various environments and utilization of devices, the adhesive layer preferably has a modulus, adhesive strength, etc. sufficient to stably perform a function in a temperature change range on the surface side of a device.

The storage modulus of the adhesive layer 30 may be 100 MPa or less, 90 MPa or less, or 80 Mpa or less at −40° C. The storage modulus of the adhesive layer 30 may be 0.1 MPa or more at −40° C.

The storage modulus of the adhesive layer 30 may be 100 MPa or less, 90 MPa or less, or 80 Mpa or less at −20° C. The storage modulus of the adhesive layer 30 may be 0.1 MPa or more at −20° C.

The storage modulus of the adhesive layer 30 may be 70 MPa or less, 55 MPa or less, or 45 Mpa or less at 0° C. The storage modulus of the adhesive layer 30 may be 0.1 MPa or more at 0° C.

The storage modulus of the adhesive layer 30 may be 50 MPa or less, 35 MPa or less, or 25 Mpa or less at 20° C. The storage modulus of the adhesive layer 30 may be 0.1 MPa or more at 20° C.

The storage modulus of the adhesive layer 30 may be 20 MPa or less, 15 MPa or less, or 5 Mpa or less at 40° C. The storage modulus of the adhesive layer 30 may be 0.1 MPa or more at 40° C.

The storage modulus of the adhesive layer 30 may be 10 MPa or less, 5 MPa or less, or 3 Mpa or less at 60° C. The storage modulus of the adhesive layer 30 may be 0.1 MPa or more at 460° C.

The adhesive strength of the adhesive layer 30 may be 200 gf/inch or more. The adhesive strength should be understood as the adhesive strength of the adhesive layer 30 after curing, and a specific evaluation method thereof is as presented in experimental examples described below.

The adhesive strength of the adhesive layer 30 may be 200 gf/inch or more, 250 gf/inch or more, 300 gf/inch or more, 350 gf/inch or more, 400 gf/inch or more, 450 gf/inch or more, 500 gf/inch or more, or 550 gf/inch or more. The adhesive strength of the adhesive layer 30 may be 2200 gf/inch or less. The adhesive strength of the adhesive layer 30 may be 2000 gf/inch or less, 1800 gf/inch or less, 1500 gf/inch or less, 1200 gf/inch or less, or 1000 gf/inch or less.

The adhesive strength of the adhesive layer 30 per unit thickness (1 μm) may be 80 gf/inch or more, 100 gf/inch or more, 110 gf/inch or more, 140 gf/inch or more, 150 gf/inch or more, or 160 gf/inch or more. The adhesive strength of the adhesive layer 30 per unit thickness (1 μm) may be 300 gf/inch or less or 250 gf/inch or less. An adhesive layer is preferably formed to have high adhesive strength per unit thickness so as to obtain an adhesive layer with sufficient adhesion even in a small thickness. The adhesive strength per unit thickness described above may vary depending on a type and thickness of an adhesive layer used, and is based on the thickness of the adhesive layer after curing.

The thickness of the adhesive layer 30 may be greater than 1 μm.

The thickness of the adhesive layer 30 may be greater than 1 μm, or may be 1.5 μm or more, 1.8 μm or more, 2 μm or more, 2.5 μm or more, 3 μm or more, or 3.5 μm or more. The thickness of the adhesive layer 30 may be 20 μm or less, 10 μm or less, 8 μm or less, or 7 μm or less. In this case, an excellent adhesive effect can be obtained.

The adhesive layer 30 has excellent optical properties.

The adhesive layer 30 is a film having a total light transmittance (light transmittance) of 85% or more according to ISO 13468. The transparent film 20 may have a light transmittance of 85% or more. For example, the light transmittance may be 88% or more, 89% or more, or 99% or less.

The haze of the adhesive layer 30 may be 3% or less. For example, the haze may be 2% or less, 1.5% or less, or 1% or less. The haze may be greater than 0%.

The yellow index YI of the adhesive layer 30 may be 3 or less. For example, the yellow index YI may be 3 or less, 2.8 or less, 2.2 or less, 1.0 or less, 0.8 or less, or 0.5 or less. The yellow index YI may be greater than 0.

The adhesive layer 30 has excellent optical properties and strong adhesion and thus helps prevent delamination from actually occurring in an environment in which bending or rolling repeatedly occurs.

The multilayer sheet 100 may be used to stably protect inner devices in an environment in which bending and folding repeatedly occur. Accordingly, there is a need for a multilayer sheet that has bending durability and absorbs external impacts and whose exposed surface is hardly scratched or dented.

In accordance with the present disclosure, a multilayer sheet that is a relatively thin stacked structure and has high hardness and a high recovery rate when measured on a surface of the multilayer sheet by a nanoindentation test or the like may be provided.

In accordance with the present disclosure, hardness, etc., which have been considered as a property of the surface of the multilayer sheet, measured by the nanoindentation test may vary depending on not only a coating layer on the surface but also other layers below the surface, even when a maximum indentation depth is only a part of the coating layer. In accordance with the present disclosure, a multilayer sheet having excellent recovery characteristics and surface characteristics such as hardness, the multilayer sheet being manufactured by forming a stacked structure including an elastic film exhibiting high durability and elasticity when bent or bolded in a relatively wide temperature range and a coating layer having excellent surface characteristics and interposing a transparent film, which has excellent transparency and functions as a support, between the elastic film and the coating layer may be provided.

The nanoindentation test is an analysis technique for measuring various mechanical properties, such as hardness, modulus of elasticity, tensile properties, and residual stress, by analyzing a force-displacement curve obtained in a process of applying a small force (load) of pN to mN to a surface of a material through an indenter having a geometric shape and removing the indenter.

An indenter tip may have various geometric shapes, e.g., a conical shape, a pyramid or triangular pyramid shape (Berkovich or Vickers triangular pyramid), and a cylindrical flat punch shape.

In general, a polymeric material is viscoelastic and thus is deformed to a maximum depth $h_{max}$ by a maximum force when indented by a tip at the bottom of an indenter, and is restored to an original state due to the elasticity of the polymeric material but a non-restored part thereof is not permanently restored, thus leaving a dent with a certain depth $h_p$, when the indenting of the polymeric material by the tip of the indenter is released by removing the indenter.

In the nanoindentation test, stiffness S, a projected contact area $A_p$, a test force F, a maximum indentation depth $h_{max}$ at a maximum force, etc. may be measured, a force-displacement curve may be obtained, and indentation modulus EIT, indentation hardness HIT, Vickers hardness HV, Martens hardness HM, indentation creep CIT or modulus of elasticity ηIT, etc. may be calculated on the basis of a result of the measurement and the force-displacement curve. The nanoindentation test may be conducted, for example, according to the ISO 14577-1:2002(E) standard.

Martens hardness (HM), also called combined hardness, is calculated on the basis of a test force, an indentation depth, etc., and provides plastic and elastic material properties, unlike indentation hardness. In Equation 1 below, HMd denotes a Martens hardness value (N/(mm²*μm)) of the multilayer sheet measured on a surface of the coating layer per thickness of the multilayer sheet, and may be obtained by dividing the Martens hardness HM by the thickness of the multilayer sheet.

The indentation creep (CIT) represents additional deformation of a material at a constant force. The indentation creep (CIT) may be calculated by indenting a sample with an indenter by a constant force for a longer period of time (several minutes to several hours) and measuring an increase in indentation depth due to continuously applied pressure. In Equation 1 below, CITd denotes an indentation creep value (%/(μm)) of the multilayer sheet measured on the surface of the coating layer per thickness of the multilayer sheet, and may be obtained by dividing the indentation creep (CIT) by the thickness of the multilayer sheet.

The recovery rate may be calculated by an equation below, based on the values measured by the nanoindentation test.

$$\text{Recovery } (\%) = [(h_{max(@30mN)} - h_p)/h_{max(@30mN)}] \times 100,$$

wherein $h_{max(@30mN)}$ denotes a maximum indentation depth (μm) when a surface of the coating layer is pressed downward by a force of 30 mN for 15 seconds and the pressing is maintained (creep) for 5 seconds, and $h_p$ denotes a depth (μm) of an indentation that remains even after the force is removed.

Rcd denotes a recovery rate (%/μm) of the multilayer sheet measured on the surface of the coating layer per thickness of the multilayer sheet, and may be obtained by dividing the recovery rate by the thickness of the multilayer sheet.

Indentation hardness $H_{IT}$, also called plastic hardness, is obtained by measuring the resistance of a material to permanent (plastic) deformation at a maximum force, and plastic properties, such as ductility, malleability, and impact resistance, may be found from the Indentation hardness $H_{IT}$. Indentation hardness $H_{IT}$ is calculated to be a value (Fmax/Ap) obtained by dividing a maximum test force Fmax by a projected contact area Ap at a penetration depth.

The measurement is performed on a surface of the coating layer by the nanoindentation test according to the ISO 14577-1:2002(E) standard, unless there are special circumstances.

It is desirable that the multilayer sheet has a certain level or higher of surface durability, impact resistance characteristics, etc., and a high recovery rate or excellent recovery capability against an external force, little permanent deformation, and has a small thickness. The TR index may be used as an index for comprehensive evaluation of these characteristics. The unit of the TR index is [/μm] and the TR index is represented by Equation 1 below.

$$TR \text{ index} = \frac{15 \times HMd \times Rcd}{CITd \times H_{IT}} \qquad \text{[Equation 1]}$$

In Equation 1 above, HMd denotes a Martens hardness value (N/(mm²*μm)) per unit thickness (1 μm) of the multilayer sheet, measured on a surface of the coating layer, CITd denotes an indentation creep value (%/μm) per unit thickness (1 μm) of the multilayer sheet, measured on the surface of the coating layer, Rcd denotes a recovery rate (%/μm) per unit thickness (1 μm) of the multilayer sheet, measured on the surface of the coating layer, and $H_{IT}$ denotes indentation hardness (N/mm²) of the multilayer sheet measured on the surface of the coating layer.

The TR index (units: /μm) of the multilayer sheet 100 measured on the surface of the coating layer may be in a range of 0.8 to 2. The TR index may be 2 or less, 1.8 or less, or 1.6 or less. The TR index may be 0.9 or more, 1 or more, 1.1 or more, or 1.2 or more. The multilayer sheet with a TR index in the above range has a relatively small thickness, a coating layer with a solid surface, an excellent capability of resisting permanent deformation, and an excellent recovery rate.

The Martens hardness HM of the multilayer sheet 100 measured on the surface of the coating layer may be 180 N/mm² or more, 187 N/mm² or more, 190 N/mm² or more, 192 N/mm² or more, 194 N/mm² or more, 196 N/mm² or more, or 197 N/mm² or more. The Martens hardness HM of the multilayer sheet 100 measured on the surface of the coating layer may be 200 N/mm$^2$ or more.

The Martens hardness value of the multilayer sheet 100 per unit thickness, measured on the surface of the coating layer, may be expressed as HMd (units: N/(mm$^2$*μm)).

The HMd value of the multilayer sheet 100 may be 1.3 N/(mm$^2$*μm) or more, 1.4 N/(mm$^2$*μm) or more, 1.5 N/(mm$^2$*μm) or more, 1.6 N/(mm$^2$*μm) or more, 1.7 N/(mm$^2$*μm) or more, 1.9 N/(mm$^2$*μm) or more, or 2.0 N/(mm$^2$*μm) or more. The HMd value of the multilayer sheet 100 may be 3 N/(mm2*μm) or less or 2.5 N/(mm2*μm) or less. A multilayer sheet having such an HMd value is thin and has excellent surface hardness characteristics.

The indentation creep CIT of the multilayer sheet 100 measured on the surface of the coating layer may be 4.3% or less, 4.2% or less, or 4.1% or less. The indentation creep CIT of the multilayer sheet 100 measured on the surface of the coating layer may be 3.5% or more.

The indentation creep value per unit thickness, measured on the surface of the coating layer, is expressed as CITd (units: %/μm).

A CITd value of the multilayer sheet 100 may be 0.05%/μm or less or 0.045%/μm or less. The CITd value of the multilayer sheet 100 may be 0.02%/μm or more or 0.025%/μm or more. The multilayer sheet having the CITd value is thin and has high resistance to deformation due to an external force.

The indentation hardness H$_{IT}$ (units: N/mm$^2$) of the multilayer sheet 100 measured on the surface of the coating layer may be 370 N/mm$^2$ or less or 360 N/mm$^2$ or less. The indentation hardness H$_{IT}$ (units: N/mm$^2$) of the multilayer sheet 100 measured on the surface of the coating layer may be 330 N/mm$^2$ or more, 335 N/mm$^2$ or more, or 340 N/mm$^2$ or more. Within the above range, the multilayer sheet 100 may have suitable plastic hardness to be applied as a protective film.

The modulus of elasticity ηIT of the multilayer sheet 100 measured on the surface of the coating layer may be 62% or more. The modulus of elasticity ηIT may be 65% or less.

The recovery rate (%) of the multilayer sheet 100 measured on the surface of the coating layer may be 68% or more. The recovery rate may be 75% or less or 73% or less.

The recovery rate value of the multilayer sheet 100 per unit thickness (1 μm), measured on the surface of the coating layer, is expressed as Rcd (%/μm).

The Rcd value of the multilayer sheet 100 may be 0.4%/μm or more, 0.5%/μm or more, or 0.55%/μm or more. The Rcd value of the multilayer sheet 100 may be 1.2%/μm or less, 1%/μm or less, or 0.8%/μm or less. In this case, the multilayer sheet 100 has a relatively excellent recovery rate relative to a thickness thereof and may have characteristics suitable to be applied as a protective film.

In the multilayer sheet 100, the length from an upper surface of the coating layer 10 to a lower surface of the elastic film 42 may be 500 μm or less, 300 μm or less, or 200 μm or less. The length may be 70 μm or more.

A ratio of the thickness of the elastic film 42 and the thickness of the transparent film may be 1:0.5 to 3 or 1:1 to 2.8. When two films are used together in the above thickness range, sufficient support characteristics, bending, elastic and recovery characteristics, and the like may be provided together.

A ratio of the thickness of the elastic film 42 and the thickness of the adhesive layer 10 may be 1:0.02 to 1, 1:0.02 to 0.6, 1:0.02 to 0.4, or 1:0.02 to 0.25. When the elastic film 42 and the adhesive layer 10 are used in the above thickness ratio, a delamination phenomenon may not occur regardless of external forces such as repeated bending and folding.

The multilayer sheet 100 may have excellent optical properties.

The haze of the multilayer sheet 100 may 3% or less, 2% or less, or 1% or less. The haze may be 0% or more or 0.5% or more.

The transmittance of the multilayer sheet 100 may be 88% or more or 90% or more. The transmittance may be 99% or less or 95% or less. The transmittance is based on total light transmittance according to ISO 13468.

The yellow index of the multilayer sheet 100 may be 1 or less, 0.8 or less, 0.65 or less, or 0.6 or less. The yellow index may be 0 or more or 0.3 or more.

Figure 3:
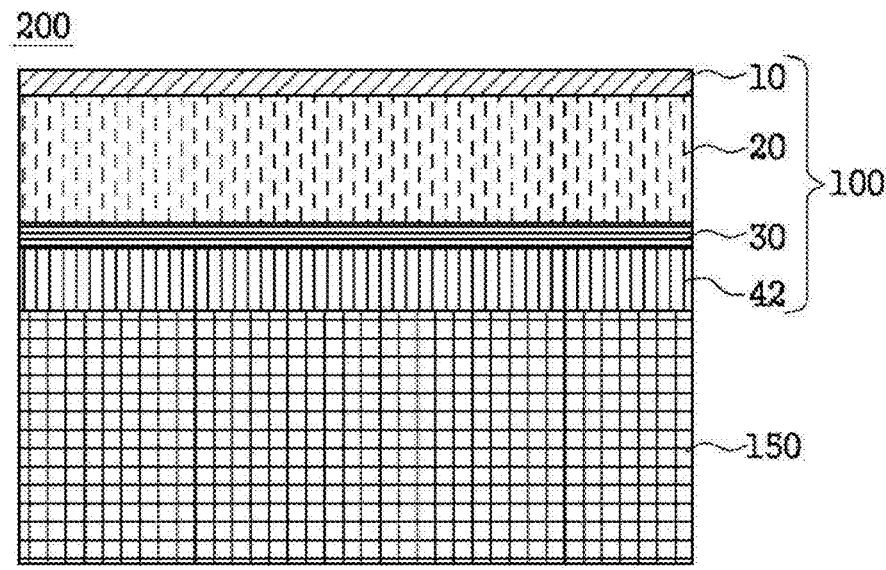
FIG. 3 is a conceptual sectional view illustrating a cross section of a structure of a multilayer electronic device according to one embodiment.

FIG. 3 is a sectional conceptual diagram illustrating a cross section of a structure of a multilayer electronic device according to one embodiment. The multilayer electronic device 200 will be described in detail with reference to FIG. 3.

The multilayer electronic device 200 includes a multilayer sheet 100 and a light-emitting functional layer 150 below the multilayer sheet 100.

The multilayer sheet 100 may be applied as a cover layer of the multilayer electronic device 200.

The multilayer electronic device 200 may be, for example, a display device, such as a large-scale display device, a foldable display device, a bendable display device, or a flexible display device. In addition, the multilayer electronic device 200 may be a bendable mobile communication device (e.g., a cellular phone) or a bendable laptop computer.

The light-emitting functional layer 150 includes an light-emitting layer (not shown).

The light-emitting layer includes an element that emits light in the display device depending on a signal. The light-emitting layer may include, for example, a signal transmission layer that transmits an external electrical signal to an electrochromic layer, the electrochromic layer provided on the signal transmission layer and emitting a color according to a given signal, and an encapsulation layer that protects the electrochromic layer. The signal transmission layer may include a thin film transistor (TFT), and for example, an LTPS, an a-SiTFT, or an oxide TFT may be applied as the signal transmission layer, but is not limited thereto. The encapsulation layer may be applied with thin film encapsulation (TFE), but is not limited thereto.

The light-emitting layer may be disposed on a support layer (not shown). The support layer may be a layer with insulation characteristics and heat resistance and may be, for example, a polyimide film, a glass layer, a PET film, or the like.

The light-emitting functional layer may further include a sensor layer (not shown). A touch sensor or the like may be applied as the sensor layer.

The light-emitting functional layer may further include a polarization layer (not shown). The polarization layer may be disposed on the light-emitting layer or the sensor layer.

Specific examples will be described in more detail below. The examples below are merely intended to help understanding of the present disclosure and the scope of the present disclosure is not limited thereto.

Preparation of adhesive composition may be performed as follows: KR-3700 of SHIN-ETSU Chemical Co., Ltd., X-92-128 of SHIN-ETSU Chemical Co., Ltd., CAT-PL-50 T, which is a platinum-based catalyst, of SHIN-ETSU Chemical Co., Ltd., and toluene were prepared as a silicone adhesive, silicone MQ resin, a catalyst, and a solvent, respectively. A composition for an adhesive layer was applied after mixing components in a ratio of the amounts of components shown in Table 1 below.

Regarding formation of adhesive layer and evaluation of physical properties of cured adhesive layer, a precursor layer was obtained by applying the composition for an adhesive layer on a PET film (NRF grade film manufactured by SKC) by die coating and drying a resulting structure so that a thickness of the resulting film after curing may be equal to that shown in Table 1 below. Drying and curing were performed at 90° C. for 5 minutes.

In an adhesion test, adhesive strength was measured by a T-Peel test using the QC-M1F UTM model of COMETECH Co., Ltd., and a peeling speed was set to 300 mm/min.

TABLE 1

| | Weight Ratio (wt %) | | | |
|---|---|---|---|---|
| | Composition of Preparation Example 1 | Composition of Preparation Example 2 | Composition of Preparation Example 3 | Composition of Preparation Example 4 |
| Silicone Adhesive (wt %) | 32.787 | 29.851 | 27.397 | 25.316 |
| Silicone MQ resin (wt %) | 0 | 7.164 | 13.151 | 18.228 |
| Catalyst (wt %) | 0.328 | 0.299 | 0.274 | 0.253 |
| Solvent (wt %) | 66.885 | 62.686 | 59.178 | 56.203 |
| Silicone MQ Resin Content (parts by weight)* | 0.000 | 23.999 | 48.002 | 72.002 |
| Catalyst Content (parts by weight)* | 1.000 | 1.002 | 1.000 | 0.999 |

| | Adhesive Strength (gf/inch) | | | |
|---|---|---|---|---|
| Thickness After Curing (μm)** | Adhesive Layer of Preparation Example 1 | Adhesive Layer of Preparation Example 2 | Adhesive Layer of Preparation Example 3 | Adhesive Layer of Preparation Example 4 |
| 1 | 40 | 33 | 60 | 67 |
| 2 | 375 | 400 | 223 | 43 |
| 3 | 489 | 570 | 174 | 60 |
| 4 | 583 | 648 | 541 | 115 |

| | Adhesive Strength (gf/inch) | | | |
|---|---|---|---|---|
| Adhesive Strength Per Unit Thickness *** | Adhesive Layer of Preparation Example 1 | Adhesive Layer of Preparation Example 2 | Adhesive Layer of Preparation Example 3 | Adhesive Layer of Preparation Example 4 |
| Adhesive Layer Having Total Thickness of 1 μm | 40 | 33 | 60 | 67 |
| Adhesive layer Having Total Thickness of 2 μm | 187.5 | 200 | 111.5 | 21.5 |
| Adhesive Layer Having Total Thickness of 3 μm | 163 | 190 | 58 | 20 |

24

TABLE 1-continued

| | | | | |
|---|---|---|---|---|
| Adhesive Layer Having Total Thickness of 4 μm | 145.75 | 162 | 135.25 | 28.75 |

*Content based on 100 parts by weight of a silicone adhesive
**Adhesive Strength measured at a corresponding thickness of the adhesive layer
*** A value obtained by dividing the adhesive strength measured at the corresponding thickness of the adhesive layer by the thickness of the adhesive layer, and expressed as adhesive strength per unit thickness of 1 μm or as gf/(inch · μm)

Referring to Table 1 above, generally, adhesive strength increased when the thickness of the adhesive layer increased, and the adhesive strength of the adhesive layer of Preparation Example 2 was the best overall when the thicknesses (excluding the thickness of 1 μm) of the adhesive layers are the same. However, Preparation Examples 1 and 3 also exhibited excellent adhesion depending on a change in thickness.

Regarding the adhesive strength value per unit thickness, overall, adhesive strength tended to increase as thickness increased but a rate of increase in adhesive strength decreased even when the same composition was used.

It was found that an adhesive layer having sufficient adhesive strength even at a relatively small thickness can be obtained.

Regarding manufacture of multilayer sheet, NRF-grade PET films manufactured by SKC were prepared in various thicknesses and applied as transparent films.

Coating layers were obtained by coating a surface of each of the transparent films with a composition for a coating layer having a composition shown in Table 2 below by die coating. Thereafter, a solvent was dried by heat treatment at 60° C. for 3 minutes and curing was performed by emitting UV light of 1J to form a coating layer having a thickness of about 5 μm.

TABLE 2

| Classification | Component | wt % |
|---|---|---|
| Solvent | propylene glycol methyl ether | 22.5 |
| | methyl isobutyl ketone | 52.5 |
| Binder | urethane acrylate | 12.9 |
| | acrylic ester | 3.8 |
| | acrylate | 7.3 |
| Photoinitiator | 1-hydroxycyclohexyl phenyl ketone | 0.8 |
| Antifouling Additive | perfluorohexylethyl acrylate | 0.2 |

In a sample to which an adhesive layer was applied, the adhesive layer was formed by applying an adhesive composition on one surface of a transparent film of a laminate structure (in which a coating layer was formed on the other surface of the transparent film) as described above, drying a resultant structure to obtain a precursor layer, and curing the precursor layer. The composition of Preparation Example 2 was applied.

An elastic film manufactured by SKC by applying the PEBA imide resin of ARKEMA FRANCE was used. The elastic film was manufactured by a suitable method, and the thickness thereof was applied as shown in the table below. In summary, polyether-block-amide resin (Arkema Pebax™ Rnew™ 72R53 or 55R53, ARKEMA FRANCE) was put into an extruder, melted and mixed at about 220° C., and thereafter extruded into a single layer to form a PEBA film having a thickness of about 35 μm or about 50 μm.

Samples in which a coating layer, a transparent film, an adhesive layer, and an elastic film were laminated sequentially were manufactured by adhering a surface of the elastic film to the other surface of the adhesive layer and curing a resultant structure.

The specific structure and thickness of each layer are shown in Table 3 below.

TABLE 3

| Sample Number | 1 | 2 | 3 | 4 | 5 | 6 | 7 |
|---|---|---|---|---|---|---|---|
| Hard Coating | 5 | 5 | 5 | 5 | 5 | 5 | 5 |
| NRF (PET) | 50 | 65 | 75 | 90 | 100 | 50 | 50 |
| PSA | — | — | — | — | — | — | — |
| PEBA (55R53 Grade) | — | — | — | — | — | 50 | — |
| PEBA (72R Grade) | — | — | — | — | — | — | 50 |
| Total Thickness (μm) of Multilayer Sheet | 55 | 70 | 80 | 95 | 105 | 105 | 105 |
| Ratio of thickness of transparent film to thickness of elastic film | — | — | — | — | — | 1.000 | 1.000 |
| Ratio of thickness of adhesive layer to thickness of elastic film | — | — | — | — | — | — | — |

| Sample Number | 8 | 9 | 10 | 11 | 12 | 13 | — |
|---|---|---|---|---|---|---|---|
| Hard Coating | 5 | 5 | 5 | 5 | 5 | 5 | — |
| NRF (PET) | 50 | 50 | 50 | 65 | 65 | 65 | — |
| PSA | 2 | 3 | 4 | 2 | 3 | 4 | — |
| PEBA (55R53 Grade) | — | — | — | — | — | — | — |
| PEBA (72R Grade) | 35 | 35 | 35 | 35 | 35 | 35 | — |
| Total Thickness (μm) of Multilayer Sheet | 92 | 93 | 94 | 107 | 108 | 109 | |
| Ratio of thickness of transparent film to thickness of elastic film | 1.429 | 1.429 | 1.429 | 1.857 | 1.857 | 1.857 | — |
| Ratio of thickness of adhesive layer to thickness of elastic film | 0.057 | 0.086 | 0.114 | 0.057 | 0.086 | 0.114 | — |

| Sample Number | 14 | 15 | 16 | 17 | 18 | 19 | — |
|---|---|---|---|---|---|---|---|
| Hard Coating | 5 | 5 | 5 | 5 | 5 | 5 | — |
| NRF (PET) | 75 | 75 | 75 | 90 | 90 | 90 | — |
| PSA | 2 | 3 | 4 | 2 | 3 | 4 | — |
| PEBA (55R53 Grade) | — | — | — | — | — | — | — |
| PEBA (72R Grade) | 35 | 35 | 35 | 35 | 35 | 35 | — |
| Total Thickness (μm) of Multilayer Sheet | 117 | 118 | 119 | 132 | 133 | 134 | |
| Ratio of thickness of transparent film to thickness of elastic film | 2.143 | 2.143 | 2.143 | 2.571 | 2.571 | 2.571 | — |
| Ratio of thickness of adhesive layer to thickness of elastic film | 0.057 | 0.086 | 0.114 | 0.057 | 0.086 | 0.114 | — |

Regarding evaluation for Properties of Multilayer Sheet, the evaluation can be implemented as follows:

(1) Optical Characteristics and Color

Optical properties and color were measured. The average visible light transmittance of each film sample was measured according to the ISO 13468 standard using a haze meter (NDH-5000W, Nippon Denshoku Industries Co., Ltd.), and haze was measured according to the ISO 14782 standard. A yellow index (YI) of each sample was measured at 10° by UltraScan PRO (HunterLab) according to the ASTM-E313 standard using a D65 light source. The result of the measurement is shown in Table 4 below.

(2) Measurement of Thickness

The thickness of each layer was measured according to the manufacturer's manual using Filmmetrics F-20. Results measured at three to five points on each sample were confirmed and an average thereof was determined as the thickness of the sample.

(3) Evaluation of Folding Durability

Multilayer films of Examples were adhered to a 35 μm-thick elastic layer (a single-layer extruded film manufactured by applying the PEBA 72R-grade resin of ARKMA FRANCE by SKC) and a dynamic bending test was conducted to evaluate folding durability. Whether cracks occurred was checked after conducting the dynamic folding test 200,000 times by bending the multilayer films to a radius of curvature of 2 mm for 2 seconds/test at ordinary temperature (about 20° C.). Whether cracks occurred was observed with the naked eye. All of multilayer film samples of Examples were evaluated as good because cracks were not visible to the naked eye.

(4) Nanoindentation Test

A nanoindentation test was performed on prepared samples. Multilayer sheet samples were cut into an A4 size and stored at 25±5° C. and 50±5% RH without separate pretreatment before the test. The samples were thereafter evaluated using a nanoindentation surface analyzer (FISCH-ERSCOPE HM2000, FISCHER). Specifically, each sample was placed on a glass test plate (Fischerscope Part No. 600-028) having a thickness of about 3T and serving as a sample holder such that a surface of a coating layer (or a surface of a transparent film when no coating layer was provided) faced upward (i.e., to be indented). Thereafter, each sample was pressed downward by a diamond tip with a force of 30 mN for 15 seconds at ordinary temperature, maintained (creep) for 5 seconds, and a nanoindentation test was conducted while moving each sample upward to measure Martens hardness HM, indentation modulus EIT, a modulus of elasticity ηIT, indentation creep CIT, maximum deformation at a force of 30 mN (hmax((@30 mN)), and a recovery rate. The measurement was performed in accordance with ISO 14577-1:2015 and 14577-2:2015. The recovery rate was calculated by the following equation:

$$\text{Recovery } (\%) = [(h_{max(@30mN)} - h_p)/h_{max(@30mN)}] \times 100,$$

wherein $h_{max(@30mN)}$ denotes a maximum indentation depth (μm) when a surface of the coating layer is pressed downward by a force of 30 mN for 15 seconds and maintained (creep) for 5 seconds, and $h_p$ denotes a depth (μm) of an indentation that remains even after the force is removed.

The evaluation results are shown in Table 4 below.

TABLE 4

| Sample Number | 1 | 2 | 3 | 4 | 5 | 6 | 7 |
|---|---|---|---|---|---|---|---|
| Haze (%) | 0.84 | 0.82 | 0.81 | 0.9 | 0.91 | ND* | ND |
| Transmittance (%) | 91.41 | 91.45 | 91.42 | 91.36 | 91.28 | ND | ND |
| Yellow Index | 0.61 | 0.82 | 0.62 | 0.89 | 0.88 | ND | ND |
| HM (N/mm$^2$) | 190.62 | 191.73 | 184.45 | 187.94 | 181.23 | 186.99 | 181.3 |
| HIT (N/mm$^2$) | 326.22 | 333.01 | 322.9 | 332.41 | 326.5 | 349.71 | 325.64 |
| EIT (Mpa) | 3279.68 | 3241.79 | 3105.44 | 3129.77 | 2931.78 | 2956.17 | 2962.57 |
| CIT (%) | 4.088 | 4.136 | 4.083 | 4.089 | 4.481 | 4.207 | 4.272 |
| ηIT (%) | 60.806 | 61.426 | 61.335 | 61.874 | 63.47 | 65.442 | 63.811 |
| Recovery (%) | 69.7644 | 70.2373 | 69.6316 | 69.9182 | 73.3398 | 74.1581 | 73.3987 |
| h max (μm) | 2.5325 | 2.5261 | 2.5742 | 2.5503 | 2.6067 | 2.5597 | 2.6011 |
| HMd (N/(mm$^2$*μm))** | 3.466 | 2.739 | 2.306 | 1.978 | 1.726 | 1.781 | 1.727 |
| CITd (%/μm)** | 0.074 | 0.059 | 0.051 | 0.043 | 0.043 | 0.040 | 0.041 |
| Rcd(%/μm)* | 1.268 | 1.003 | 0.870 | 0.736 | 0.698 | 0.706 | 0.699 |
| TR index** | 2.720 | 2.095 | 1.827 | 1.526 | 1.298 | 1.346 | 1.367 |

| Sample Number | 8 | 9 | 10 | 11 | 12 | 13 | — |
|---|---|---|---|---|---|---|---|
| Haze (%) | 0.79 | 0.83 | 0.78 | 0.9 | 0.88 | 0.68 | — |
| Transmittance (%) | 91.09 | 91.05 | 91.05 | 91.21 | 91.38 | 91.08 | — |
| Yellow Index | 0.44 | 0.43 | 0.47 | 0.45 | 0.45 | 0.47 | — |
| HM (N/mm$^2$) | 198.66 | 197.32 | 196.47 | 197.56 | 197.7 | 197.2 | — |
| HIT (N/mm$^2$) | 358.7 | 355.59 | 357.64 | 356.29 | 357.25 | 355.58 | — |
| EIT (Mpa) | 3245.69 | 3226.77 | 3190.7 | 3235.21 | 3229.28 | 3224.84 | — |
| CIT (%) | 4.029 | 4.064 | 4.018 | 3.989 | 4.025 | 4.038 | — |
| ηIT (%) | 63.146 | 63.084 | 63.688 | 63.05 | 63.017 | 63.003 | — |
| Recovery (%) | 70.8949 | 70.6586 | 70.9201 | 70.7838 | 70.7842 | 70.8898 | — |
| h max (μm) | 2.4793 | 2.4886 | 2.4928 | 2.4853 | 2.4852 | 2.4886 | — |
| HMd (N/(mm$^2$*μm))** | 2.159 | 2.122 | 2.090 | 1.846 | 1.831 | 1.809 | — |
| CITd (%/μm)** | 0.044 | 0.044 | 0.043 | 0.037 | 0.037 | 0.037 | — |
| Rcd(%/μm)** | 0.771 | 0.760 | 0.754 | 0.662 | 0.655 | 0.650 | — |
| TR index** | 1.589 | 1.556 | 1.547 | 1.379 | 1.352 | 1.340 | — |

| Sample Number | 14 | 15 | 16 | 17 | 18 | 19 | — |
|---|---|---|---|---|---|---|---|
| Haze (%) | 0.84 | 0.85 | 0.85 | 0.84 | 0.88 | 0.81 | — |
| Transmittance (%) | 91.15 | 91.09 | 91.07 | 90.97 | 90.98 | 90.96 | — |
| Yellow Index | 0.46 | 0.43 | 0.46 | 0.6 | 0.58 | 0.58 | — |
| HM (N/mm$^2$) | 193.27 | 190.28 | 192.88 | 196.82 | 196.38 | 194.75 | — |
| HIT (N/mm$^2$) | 345.34 | 338.73 | 343.37 | 351.74 | 351.52 | 348.35 | — |
| EIT (Mpa) | 3193.37 | 3154.77 | 3192.08 | 3248.49 | 3236.75 | 3213.32 | — |
| CIT (%) | 4.031 | 4.036 | 4.072 | 4.022 | 4.017 | 4.002 | — |
| ηIT (%) | 62.437 | 62.393 | 62.225 | 62.547 | 62.627 | 62.502 | — |
| Recovery (%) | 69.946 | 69.8416 | 69.6958 | 70.1714 | 70.2276 | 69.9061 | — |
| h max (μm) | 2.5136 | 2.5336 | 2.5171 | 2.4906 | 2.4933 | 2.5034 | — |
| HMd (N/(mm$^2$*μm))** | 1.652 | 1.613 | 1.621 | 1.491 | 1.477 | 1.453 | — |
| CITd (%/μm)** | 0.034 | 0.034 | 0.034 | 0.030 | 0.030 | 0.030 | — |
| Rcd (%/μm)** | 0.598 | 0.592 | 0.586 | 0.532 | 0.528 | 0.522 | — |
| TR index** | 1.245 | 1.236 | 1.212 | 1.109 | 1.102 | 1.093 | —— |

*ND means not determined

**HMD is a value obtained by dividing HM (N/mm$^2$) by total thickness (μm).

**CITd is a value obtained by dividing CIT (%) by total thickness (μm)

**Rcd is a value obtained by dividing recovery (recovery rate (%)) by total thickness (μm)

**The unit of the TR index is [/μm] and the TR index is represented by Equation 1 below.

$$TR \text{ index} = \frac{15 \times HMd \times Rcd}{CITd \times H_{IT}} \qquad \text{[Equation 1]}$$

In Equation 1 above, HMd denotes a Martens hardness value (N/(mm$^2$*μm)) per unit thickness (1 μm) of the multilayer sheet, measured on a surface of the coating layer, CITd denotes an indentation creep value (%/μm) per unit thickness (1 μm) of the multilayer sheet, measured on the surface of the coating layer, Rcd denotes a recovery rate (%/μm) per unit thickness (1 μm) of the multilayer sheet, measured on the surface of the coating layer, and H$_{IT}$ denotes the indentation hardness (N/mm$^2$) of the multilayer sheet measured on the surface of the coating layer.

Referring to Tables 2 and 3 above, it may be confirmed that characteristics such as surface hardness vary depending on the form in which components of a multilayer sheet are laminated. To apply the multilayer sheet, for example, as a cover sheet of a display device, the multilayer sheet should have excellent optical properties, partially include an elastic layer to not be easily scratched, to be highly resistant to permanent deformation such as scratches by a large force, and to have impact resistance, and have a high recovery rate not to be easily indented. it can be seen that samples 8 to 19 above have appropriate levels or higher of hardness, indentation creep, a recovery rate, which may vary according to the thickness or the like of the applied film, and thus the multilayer sheets of Examples have excellent properties to be applied as a display protection sheet.

A multilayer sheet and a multilayer electronic device according to an embodiment are not likely to be actually delaminated from a substrate even when repeatedly folded or rolled and have excellent surface hardness so as not to be easily scratched or stabbed. The multilayer sheet can be used as a cover sheet for a display, and the multilayer electronic device can be used for various purposes.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A multilayer sheet comprising:
a transparent film with a total light transmittance of 85% or more in accordance with ISO 13468;
a coating layer disposed on a first surface of the transparent film; and
an elastic film disposed below a second surface of the transparent film,
wherein the coating layer has a Martens hardness (HM) of 180 N/mm$^2$ or more measured on a surface of the coating layer, wherein a modulus of elasticity (ηIT) measured on the surface of the coating layer is 62% or more, and
wherein the multilayer sheet is configured to provide flexibility and scratch resistance suitable for a foldable display device.

2. The multilayer sheet of claim 1, wherein a ratio of a thickness of the transparent film to the elastic film is in a range of 0.5 to 3.

3. The multilayer sheet of claim 1, wherein a strain-restoration index (TR index) is a value according to:

$$TR \text{ index} = \frac{15 \times HMd \times Rcd}{CITd \times H_{IT}},$$

wherein the TR index measured on a surface of the coating layer is in a range of 0.8 to 2, wherein a unit of the TR index is μm,
HMd denotes a Martens hardness value (N/(mm$^2$*μm)) per unit thickness (1 μm) of the multilayer sheet measured on a surface of the coating layer,
CITd denotes an indentation creep value (%/μm) per unit thickness (1 μm) of the multilayer sheet measured on the surface of the coating layer,
Rcd denotes a recovery rate (%/μm) per unit thickness (1 μm) of the multilayer sheet measured on the surface of the coating layer, and
H$_{IT}$ denotes indentation hardness (N/mm$^2$) of the multilayer sheet measured on the surface of the coating layer.

4. A multilayer sheet comprising:
a transparent film;
a coating layer disposed on a first surface of the transparent film;
an adhesive layer below a second surface of the transparent film; and
an elastic film below the adhesive layer,
wherein a ratio between a thickness of the elastic film and a thickness of the adhesive layer is 1:0.02 to 1, and
wherein a Martens hardness (HM) measured on a surface of the coating layer is 180 N/mm$^2$ or more.

5. The multilayer sheet of claim 4, wherein an indentation creep value per unit thickness (1 μm) of the multilayer sheet measured on a surface of the coating layer is in a range of 0.02%/μm to 0.05%/μm.

6. The multilayer sheet of claim 4, wherein a recovery rate per unit thickness (1 μm) of the multilayer sheet measured on the surface of the coating layer is in a range of 0.4%/μm to 1.2%/μm.

7. The multilayer sheet of claim 4, wherein a recovery rate of the multilayer sheet is 66% or more.

8. A multilayer electronic device comprising:
a multilayer sheet including:
a transparent film having a total light transmittance of 85% or more in accordance with ISO 13468;
a coating layer disposed on a first surface of the transparent film;
an elastic film disposed below a second surface of the transparent film; and
a light-emitting functional layer disposed below the multilayer sheet,
wherein the coating layer has a Martens hardness (HM) of 180 N/mm$^2$ or more measured on a surface thereof, and
wherein a modulus of elasticity (ηIT) measured on the surface of the coating layer is 62% or more.

9. The multilayer electronic device of claim 8, further comprising:

an adhesive layer below the second surface of the transparent film, wherein the elastic film is disposed below the adhesive layer.

10. The multilayer electronic device of claim 8, wherein a ratio of a thickness of the transparent film to the elastic film is in a range of 0.5 to 3.

11. The multilayer electronic device of claim 8, wherein the transparent film has a total light transmittance of 85% or more in accordance with ISO 13468.

12. The multilayer electronic device of claim 11, wherein a strain-restoration index (TR index) is a value according to:

$$TR \text{ index} = \frac{15 \times HMd \times Rcd}{CITd \times H_{IT}},$$

wherein the TR index measured on a surface of the coating layer is in a range of 0.8 to 2, wherein a unit of the TR index is μm, HMd denotes a Martens hardness value $(N/(mm^2 * \mu m))$ per unit thickness (1 μm) measured on a surface of the coating layer, CITd denotes an indentation creep value (%/μm) per unit thickness (1 μm) measured on the surface of the coating layer, Rcd denotes a recovery rate (%/μm) per unit thickness (1 μm) measured on the surface of the coating layer, and $H_{IT}$ denotes indentation hardness $(N/mm^2)$ measured on the surface of the coating layer.

13. The multilayer electronic device of claim 8, wherein the multilayer sheet further comprises an adhesive layer disposed between the transparent film and the elastic film.

14. The multilayer electronic device of claim 13, wherein the transparent film has a haze of 3% or less and a yellow index of 3 or less.

15. The multilayer electronic device of claim 13, wherein a ratio between a thickness of the elastic film and a thickness of the adhesive layer is 1:0.02 to 1.

16. The multilayer electronic device of claim 8, wherein a recovery rate of the multilayer electronic device is 66% or more.

* * * * *